Dec. 15, 1959   P. F. BLACK ET AL   2,916,816

METHOD OF MAKING HOSE ASSEMBLY

Filed April 29, 1955

INVENTORS.
PAUL F. BLACK
RAY H. GILL
WALTER J. LeBLANC
BY
John D. Haney
ATTY.

United States Patent Office 2,916,816
Patented Dec. 15, 1959

2,916,816
METHOD OF MAKING HOSE ASSEMBLY

Paul F. Black, Troy, Ray H. Gill, Akron, and Walter J. Le Blanc, Troy, Ohio, assignors to The B. F. Goodrich Company, New York, N.Y., a corporation of New York Application April 29, 1955, Serial No. 504,748

2 Claims. (Cl. 29—507)

This invention relates to an improved mode of anchoring an end of a flexible hose within a rigid casing member, and to the resulting assembly of a hose and casing member.

A principal object of this invention is to provide a permanent fluid-tight connection between a flexible thin wall hose of comparatively small outer diameter and a rigid casing member through which fluid under substantial pressure may be conducted to or from the hose. In the practice of this invention the casing member may be an appropriate fitting such as a manifold or coupling member or it may be an integral part of a machine structure. The assembly provided by this invention is especially suitable for hoses of fabric-reinforced rubber-like material having a wall thickness in the order of about $\frac{1}{16}$ inch and an outer diameter less than about $\frac{3}{4}$ inch. Because of its simplicity and convenience in assembling, the assembly is comparatively inexpensive and may be advantageously utilized in hydraulic brake structures and the like, and it is particularly useful for connecting a group of hoses in closely spaced relation to a common casing member.

In accordance with this invention a hose end is assembled in a socket formed in a rigid casing member together with a tubular fastener which is disposed within the bore of the hose end. To secure the hose end against axial displacement from the socket, force is applied axially of the fastener to cause the walls of the fastener to buckle or bulge radially outwardly against the walls of the hose to press the hose into fluid-tight engagement with the side walls of the socket. The surface of the sidewall of the socket is preferably contoured suitably to engage the outer surface of the hose to increase the gripping engagement of the socket. The casing member includes an access opening into the casing coaxial with the socket to permit the insertion into the fastener of an appropriate tool to effect the axial buckling of the fastener.

The invention will be further described in connection with an embodiment of the invention illustrated in the accompanying drawings, in which.

Figure 1:
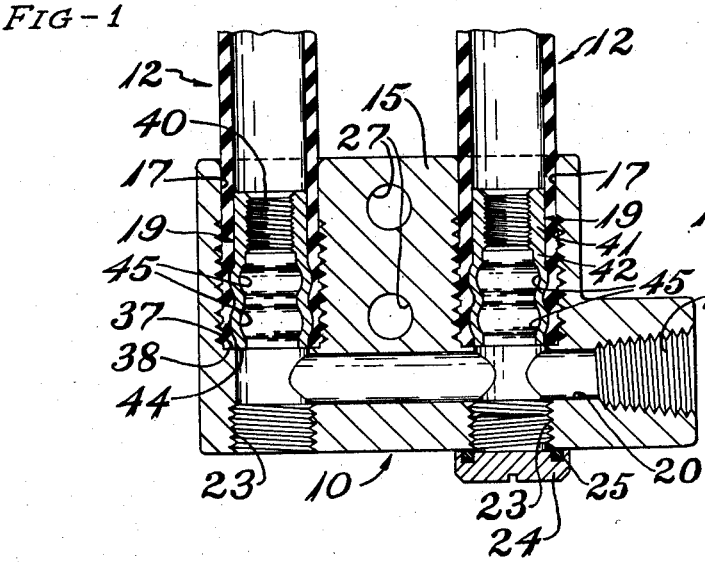
Fig. 1 is a cross-sectional view through a manifold fitting to which a pair of hoses are connected in accordance with this invention.
Figure 2:
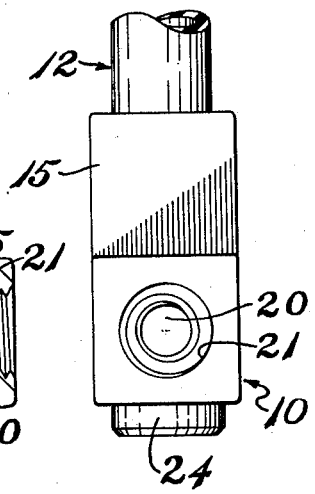
Fig. 2 is an end view of the manifold fitting.

Referring to Fig. 1, the casing member 10 is illustrated in the form of a manifold to conduct fluid to a pair of hoses 12 connected to the casing member. The casing member includes a rigid non-yielding body 15 preferably of steel having a pair of sockets 17 therein into which the ends 18 of the hoses 12 are seated. Each of the hose ends 18 is secured in its respective socket 17 by a tubular fastener 19. The hose ends 18 are interconnected for communication with each other by a passage 20 through the body of the fitting which extends to a mouth 21 at the side of the body which is internally threaded to receive a conduit (not shown) from an appropriate fluid reservoir (not shown). The body 15 additionally includes a pair of openings 23 coaxial with the sockets 17 to provide access to the fasteners 19 with a tool to effect the axial buckling of the fasteners. The openings 23 are internally threaded to receive closure plugs 24 which are threaded into the openings 23 after the fasteners are secured against the hose ends. The closure plugs 24 are maintained in sealing engagement with the body by resilient sealing rings 25 embedded in the body-contacting side of the head of the plug. The body is also provided with a pair of holes 27 to receive bolts (not shown) to secure the assembly to the equipment with which it is associated.

The mode of connecting hose members provided by this invention is particularly effective for hoses or tubing of thin walls and of comparatively small diameter where space to receive fastening member is very limited. Normally a thin-walled hose subjected to fluid under pressure will include an inner tube 30 of rubber-like material with a surrounding fabric reinforcement 31 braided, woven or wrapped about the inner tube as represented in the drawings. If space limitations permit the fabric 31 may be provided with a thin coating of rubber 32 although the fabric reinforcement may be exposed on the outer surface of the hose. Since in this assembly the engagement of the hose with the body depends in part on the frictional engagement of the outer surface of the hose with the sidewall of the socket, it is desirable though not essential to have the fabric of the hose exposed along the end portion 18 to augment the frictional engagement of the hose end with the sidewall of the socket.

Each of the sockets 17 is generally cylindrical and has a diameter substantially equal to the outer diameter of the hose so that the hose fits snugly into the socket. The sidewall of each socket is grooved circumferentially to provide a generally corrugated contour to the surface of the wall of the socket along a major portion of its depth as at numeral 34 to engage the outer surface of the hose when the hose end is urged against the sidewall of the socket by the fastener 19. At the bottom of each of the sockets 17 there is formed an annular ledge 37, the radial width of which is substantially equal to but preferably not greater than the thickness of the wall of the hose. Each hose end is seated within its respective socket with the end face 38 of the hose abutting the ledge 37. The access openings 23 communicate with the bore of their respective hoses at the ledge 37 and the diameter of each access opening is equal to or greater than the bore of its respective hose.

Figure 3:
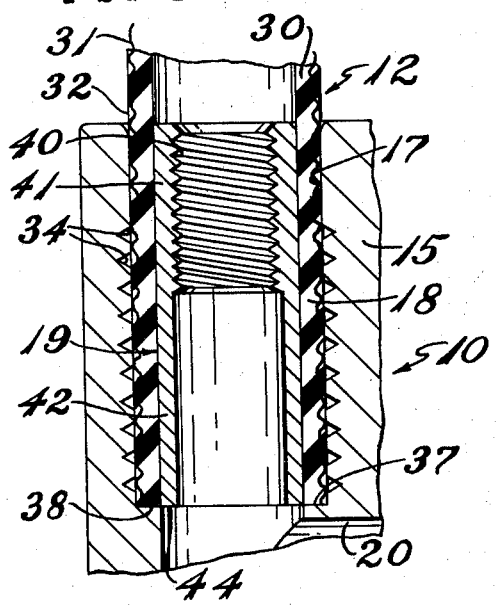
Fig. 3 is an enlarged fragmentary cross-sectional view showing a hose assembled with a fastener within a casing member but before the fastener is axially buckled to engage the hose.

The tubular fasteners 19 are preferably of a metal which is malleable and resistant to corrosion by the fluid conducted through the hoses. Brass is a particularly suitable material for the fasteners when they are subjected to oils such as hydraulic brake fluid. The fasteners are initially about equal in length to the depth of the socket 17 and in structure they have the general characteristics of "Rivnut" fasteners manufactured by The B. F. Goodrich Company. As shown in Fig. 3, one end of the fastener is threaded internally at numeral 40 and these threads extend through nearly half the length of the fastener. The wall portion 41 of the fastener is thick throughout the thread portion and from the threads 40 to the opposite end of the fastener the wall portion 42 of the fastener is materially thinner than the wall portion 41. The threads 40 are provided in order to accomplish the buckling and bulging of the fastener by an appropriate "Rivnut" upsetting tool which is well known in the art.

In general, these tools (not illustrated) include a threaded shank which is engageable with the threads 40, and a mandrel surrounding the shank which is adapted to abut the end face 44 of the fastener. The tool may be operated to force the threaded shank axially through the mandrel thereby applying opposed axial force on the fastener to bulge its walls radially outward as at numeral 45 against the end of the hose.

In making the assembly shown in Fig. 1, the fastener 19 is preferably inserted into the bore of the end 18 of each hose so that the end face 42 of the fastener is flush with the end face and then each hose end is inserted into its respective socket 17 until its end face 38 rests upon the ledge 37 at the bottom of the socket. A buckling tool of the type mentioned in the previous paragraph is then inserted through an access opening 23, the mandrel of the tool fitting directly against the end face 44 of the fastener and the threaded shank of the tool threaded into the threads 40 of the fastener. The tool is then operated to move the shank portion through the mandrel axially of the opening 23 while the mandrel is maintained stationary so that an appreciable force is exerted on opposite ends of the fastener in an axial direction. This axial force urges the threaded end 40 of the fastener toward the bottom of the socket 17 with the result that the thin wall portion 42 of the fastener is caused to bulge radially outward as at 45 to press the wall of the hose end tightly against the side wall of the socket 17.

Figure 4:
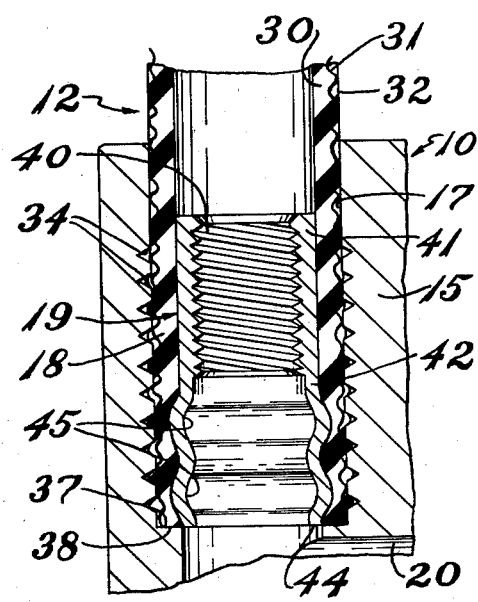
Fig. 4 is a view similar to Fig. 3 but showing the assembly after the fastener is axially buckled.

We have found that a fastener having substantially the proportions shown in Fig. 3 tends to bulge outwardly in two places in its thin wall portion as indicated by the bulges 45 in Fig. 4. This double-bulge effect greatly contributes to the holding power of the fastener and the fluid-tight engagement of the hose end with the wall of the socket. The portion of the hose carcass in the region adjacent the crest of the bulges 45 is caused by the bulges to flow into the region intermediate the bulges and packs the portion of the hose carcass adjacent its end face 38 tightly against the ledge 37 of the socket and into the corner at the bottom of the socket. The bulges also cause the outer surface of the hose to be squeezed into the grooves 34 which provide a positive grip on the hose end in addition to the frictional engagement of the socket walls with the hose end. Forming the bulges 45 by axially buckling the fastener has the further advantage in that the wall of the fastener is not thinned appreciably and hence weakened or cracked in the bulged portions thus avoiding a potential source of leakage. Since the fastener fits snugly within the hose end, the axial buckling force applied to the threaded end tends to urge the hose end axially toward the bottom of its socket and pack the hose end tightly around the fastener even in the regions remote from the bulges of the fastener.

Normally the step of buckling the fastener can be accomplished very quickly by suitable power tools and after the bulges are formed the tool is disengaged from the fasteners and withdrawn from the openings 23. Each of the openings is then capped with the fluid-tight closure plugs 24. The closure plugs 24 may serve as bleeder plugs for a hydraulic system in which this assembly is employed, if desired.

Figure 5:
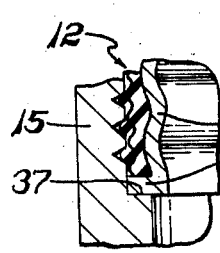
Fig. 5 is a fragmentary view similar to Fig. 4 but showing a modified form of fastener.

In the modification shown in Fig. 5, a tubular fastener 50 is employed of the same structure as that of Fig. 3 but in addition having an annular head 51 formed about the edge of the fastener at the mouth of the hose. The head 51 abuts the end face 38 of the hose and in turn is seated upon the ledge 37 within the socket. This head prevents axial displacement of the fastener into the hose during the assembly if the dimensions of the fastener and hose end are such that the fastener fits loosely within the hose end.

The invention may be used to advantage with malleable metal tubing if desired as well as with rubber hoses as illustrated.

Variations in the structure and procedure described may be made within the scope of the appended claims.

We claim:

1. A method of fastening one end of a hose in fluid-conducting sealing engagement within a rigid casing member, which method comprises providing a cylindrical socket in said casing member adapted to snugly receive said hose end and an access opening through the casing member connecting axially with the bottom of said socket, assembling the hose end within said socket together with a tubular open-ended cylindrical axially deformable fastener disposed snugly within the bore of said hose end and embraced throughout its length within said socket, the fastener including a thin walled portion adjacent the mouth of the bore of said hose end and integral with a thicker walled internally threaded portion inside the hose end, inserting a tool through said access opening to abut the end of said thin walled portion of said fastener and so that the tool is threaded into said thick walled portion, and then with said tool applying opposing force axially against opposite ends of the fastener to axially buckle said thin walled portion of the fastener into a sinuous shape including two axially spaced regions bulged radially outward to maintain the wall of said hose end in confining pressure engagement with said cylindrical wall of said socket, and then disengaging and withdrawing the tool from said fastener.

2. A method of fastening one end of a hose in fluid conducting sealing engagement within a rigid casing member enclosing said end of the hose, which method comprises providing a cylindrical socket in said casing member adapted to snugly receive said hose end, said socket communicating with fluid conducting passages in the casing and with an access opening through the opposite side of the casing member axial with said socket, assembling the hose end within said socket together with a tubular open-ended cylindrical fastener seated snugly in the bore of said hose end and embraced throughout its length by said socket, said fastener including a thick walled internally-threaded end portion and a thinner smooth-bore wall portion extending from said threaded portion to an annular end face at the opposite end of the fastener flush with the end face of said hose end, inserting a fastener-buckling tool through said access opening to engage the annular end face of the fastener and so that the tool is threaded into said thick walled opposing end of said fastener, and then with said tool pulling said thick-walled portion of the fastener axially toward the bottom of said socket while maintaining the annular end face of the fastener against displacement until said thin walled portion of the fastener is bulged radially outward in localized positions to press said hose end radially against the surrounding socket walls, and then disengaging and withdrawing the tool from said fastener.

References Cited in the file of this patent

UNITED STATES PATENTS

| | | |
|---|---|---|
| 355,137 | Bushnell | Dec. 28, 1886 |
| 586,438 | Inshaw | July 13, 1897 |
| 1,647,321 | Thurstensen | Nov. 1, 1927 |
| 1,734,025 | Zeibig | Oct. 29, 1929 |
| 1,753,005 | Grady | Apr. 1, 1930 |
| 2,062,449 | Dick | Dec. 1, 1936 |
| 2,146,756 | Miller | Feb. 14, 1939 |
| 2,268,088 | Scholtes | Dec. 30, 1941 |
| 2,295,830 | Carlson | Sept. 15, 1942 |
| 2,386,109 | Glessner | Oct. 2, 1945 |
| 2,562,019 | Colley | July 24, 1951 |
| 2,683,928 | Carlson | July 20, 1954 |
| 2,710,203 | Hunter et al. | June 7, 1955 |

FOREIGN PATENTS

| | | |
|---|---|---|
| 646,298 | Great Britain | Nov. 22, 1950 |
| 147,218 | Australia | July 7, 1952 |